United States Patent
Kassiedass

(10) Patent No.: US 8,620,282 B2
(45) Date of Patent: Dec. 31, 2013

(54) IN-CALL, AUDIBLE CALL WAITING

(75) Inventor: Sanathan Kassiedass, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 181 days.

(21) Appl. No.: 13/035,768

(22) Filed: Feb. 25, 2011

(65) Prior Publication Data
US 2011/0263235 A1    Oct. 27, 2011

Related U.S. Application Data

(60) Provisional application No. 61/327,537, filed on Apr. 23, 2010.

(51) Int. Cl.
H04M 3/42    (2006.01)
(52) U.S. Cl.
USPC ............... 455/414.1; 455/415; 379/142.08; 379/93.35; 379/215.01
(58) Field of Classification Search
USPC ............. 455/415, 414.1; 379/142.08, 93.35, 379/215.01
See application file for complete search history.

(56) References Cited

U.S. PATENT DOCUMENTS

| | | | |
|---|---|---|---|
| 6,625,476 B1 | 9/2003 | Perng | |
| 6,687,338 B2 | 2/2004 | Seligmann | |
| 7,292,823 B2 | 11/2007 | Kuo | |
| 7,308,289 B2 | 12/2007 | Sychta | |
| 7,492,748 B2 | 2/2009 | Swartz et al. | |
| 7,525,990 B2 | 4/2009 | Bossemeyer, Jr. et al. | |
| 7,542,787 B2 | 6/2009 | Zhang et al. | |
| 2003/0035526 A1* | 2/2003 | Bull et al. | 379/142.08 |
| 2006/0135214 A1* | 6/2006 | Zhang et al. | 455/569.1 |
| 2006/0183513 A1 | 8/2006 | Slamka et al. | |
| 2007/0042812 A1 | 2/2007 | Basir | |
| 2007/0047708 A1 | 3/2007 | Boillot et al. | |
| 2007/0281753 A1 | 12/2007 | Dobler et al. | |
| 2008/0119179 A1 | 5/2008 | Lay et al. | |
| 2009/0318081 A1 | 12/2009 | Winter | |

FOREIGN PATENT DOCUMENTS

| | | |
|---|---|---|
| EP | 1511277 A1 | 3/2005 |
| WO | 2007/033459 A1 | 3/2007 |

OTHER PUBLICATIONS

Tong Zhang, "BlackBerry VM-605 Visor Mount Bluetooth Car Kit," www.mobiletechreview.com, date unknown, at least as early as Apr. 23, 2010.

Canadian Office Action dated Jan. 15, 2013 for Canadian Application No. 2,733,023.

* cited by examiner

Primary Examiner — Justin Lee
(74) Attorney, Agent, or Firm — Michael J. DeLuca; Fleit Gibbons Gutman Bongini & Bianco PL

(57) ABSTRACT

A handsfree device is disclosed that offers additional wireless telephone services to the user of a wireless device in a minimally distracting manner. A call-waiting notification of a second call is presented acoustically via the handsfree device to a user. A responsive action by the user to request caller-ID information yields an audible presentation of caller-ID information related to the second call. The user may then elect to answer the second call.

16 Claims, 3 Drawing Sheets

IN-CALL, AUDIBLE CALL WAITING

CROSS-REFERENCE TO RELATED APPLICATION

This application claims priority to U.S. Provisional Application No. 61/327,537 titled "In Call, Audible Call Waiting" filed on Apr. 23, 2010, the contents of which are incorporated in entirety by reference.

BACKGROUND OF THE DISCLOSURE

The present disclosure relates to wireless communication apparatus and method and more particularly relates to apparatus and method for enabling a user to interact with a wireless communication apparatus while in a transportation vehicle.

Attending to telephone calls while driving has been determined to be a distraction to the driver and potentially present a problem of safety. Numerous government entities have enacted regulations that restrict drivers in the manner in which the drivers interact with the radio communication apparatus. Among the restrictions in many jurisdictions is the limitation that a driver may only use a wireless telephone device while actively driving when that telephone is operated in what is commonly known as a handsfree mode. Such a mode reduces the physical interaction with the wireless telephone device and minimizes the need for the driver to view the wireless telephone device and is deemed to be a safer way of operating a vehicle while engaged in a telephone call.

Vehicular installations have been developed to provide a speaker and microphone, separate from the wireless device, that are mounted in the passenger compartment of a vehicle. These acoustic transducers and their control mechanism implement the acoustic and control apparatus of a handsfree device. If the wireless device is a handheld telephone, additional mounting hardware may be included such that the handheld may be physically mounted in the vehicle, be supplied electrical power for operation, be coupled to an external antenna, and make electrical connections to the handsfree device.

Short-range electromagnetic communications, separate from the radio communications between the wireless device and its fixed network, has become commonplace in connecting a wireless device to acoustic transducers attached to a user's person. One often encounters a wireless telephone user wearing what is commonly called a Bluetooth headset in order to talk and listen to a wireless telephone. "Bluetooth" refers to a short-range radio communications technology used to replace the wires connecting associated devices. It is an open and proprietary IEEE 802.15 standard for exchanging data over short distances by using frequency hopping in a 2.402-2.480 GHz frequency band. A process of device pairing, basically an exchange of security keys, enables two Bluetooth devices to communicate.

Handsfree operation in a vehicle has been implemented as a visor mounted, or otherwise conveniently mounted, device that provides a short range electromagnetic coupling between the user's wireless device and the handsfree device and an optimized acoustic coupling to the user. This car kit, as it is sometimes called, employs Bluetooth or other short-range communication protocol to connect to and operate in conjunction with the wireless device. One example of such a car kit is a BlackBerry VM-605, available from Research in Motion Limited of Waterloo, Ontario, Canada.

The handsfree accessories for wireless telephones have helped decrease the potential safety problem of distracted drivers using a wireless device. However, there remain times when it is inconvenient or unsafe to use the wireless device in a traditional manner; for example, typing on the keypad or viewing the screen. For these instances a basic Bluetooth headset or car kit may enable handsfree calling, but other significant wireless telephone services remain inaccessible. Therefore, it is desirable that advancements in handsfree calling apparatus be made to offer additional wireless telephone services in a minimally distracting manner.

DETAILED DESCRIPTION

Figure 1:
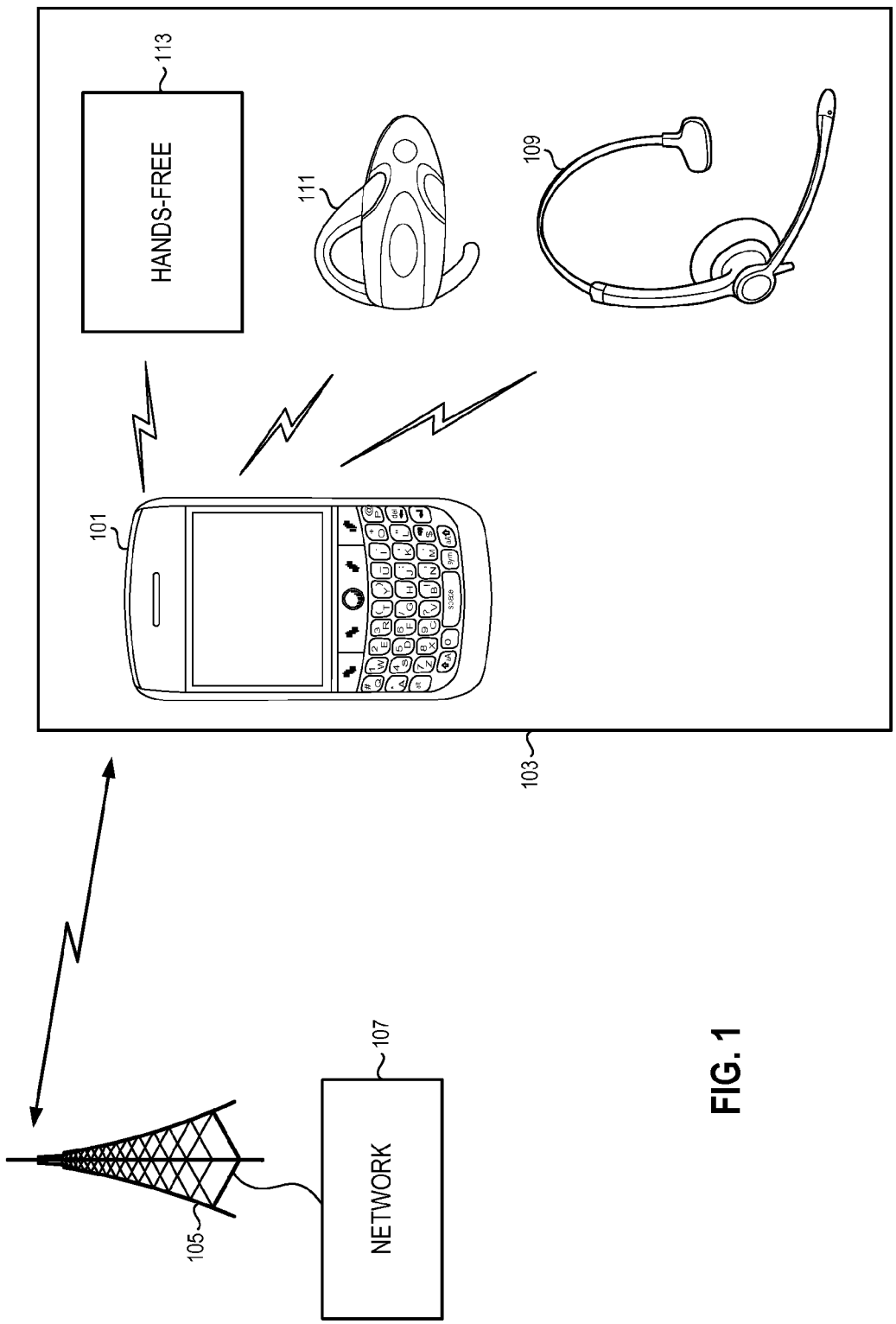
FIG. 1 is a system block diagram illustrating a radio communication system capable of employing the present disclosure.

In order to provide the user of a wireless device with a reduced distraction communication experience and to offer wireless telephone services with similar low distraction implementations for use while driving a vehicle, the present disclosure, as claimed in the claims below, has been created. Call-waiting telephone service can, with the incorporation of the present disclosure, be implemented now as a low distraction feature. A method is disclosed for providing communications between a handsfree device and a user wireless device engaged in communications with a network providing a call-waiting feature and caller-ID information. The method includes presenting acoustically a call-waiting notification of a second call to the user when the wireless device is engaged in a first call, receiving a response to the call-waiting notification from the user, and presenting caller-ID information related to the second call acoustically to the user in response to receiving the call-waiting notification response.

An apparatus is disclosed, which provides handsfree communications for a wireless device engaged in communications with a service providing network that offers the services of call-waiting and caller-ID information, includes a transceiver, a user-activated input device, first and second acoustic transducers that are switchably coupled to the wireless transceiver, and a processor and associated memory. The processor and memory are configured to accept an indication from the transceiver of a second call made by a caller and directed to the wireless device while the wireless device is engaged in a first call, receive an indication of an identity of the caller, deliver an alert to the user of the wireless device signifying the second call indication, and accept an activation of the user-activated input device by the user, thereby implementing a desire by the user to learn the identity of the caller. Upon the activation of the user-activated input device the processor and memory are configured to convert the indication of the caller identity to a speech signal, to decouple the switchably coupled first acoustic transducer from the transceiver, and couple the speech signal to the switchably coupled second acoustic transducer, thereby enabling the user to be educated as to the identity of the caller, from which the user may decide whether to answer the second call.

A method is disclosed for providing communications between a handsfree device, which includes a wireless transceiver, a user-activated input device, first and second acoustic transducers, and a processor and associated memory, and a user wireless device engaged in communications with a network providing a call-waiting feature and caller-ID information. The method includes accepting from the wireless device an indication of a second call made by a caller and directed to the wireless device while the wireless device is engaged in a first call, receiving an indication of an identity of the caller from the wireless device, delivering an alert to the user of the wireless device signifying the indication of the second call, and accepting an activation of the user-activated input device by the user, thereby implementing a desire by the user to learn the identity of the caller. In response to the activation of the user-activated input device, the operations include converting the indication of the caller identity to a speech signal, decoupling the first acoustic transducer from the transceiver, and coupling the speech signal to the second acoustic transducer, thereby enabling the user to be educated as to the identity of the caller, from which the user may decide whether to answer the second call.

A computer readable medium at a handsfree device is disclosed having stored therein a set of instructions that when executed cause a processor to provide call communications for the handsfree device and a user wireless device engaged in communications with a network providing a call-waiting feature and caller-ID information. The handsfree device includes a transceiver, a user-activated interface device, and first and second acoustic transducers. The instructions in the computer readable medium include accepting from the wireless device an indication of a second call made by a caller and directed to the wireless device while the wireless device is engaged in a first call, receiving an indication of an identity of the caller from the wireless device, delivering an alert to the user of the wireless device signifying the indication of the second call, accepting an activation of the user-activated input device by the user, converting the indication of the caller identity to a speech signal in response to the activation of the user-activated input device, decoupling the first acoustic transducer from the transceiver in response to the activation of the user-activated switch; and coupling, in response to the activation of the user-activated switch, the speech signal to the second acoustic transducer.

A system capable of employing the present disclosure is illustrated in FIG. 1. A user wireless device 101, which may range in complexity from a single function radiotelephone to a multipurpose, multimode handheld device that includes among its functions a radiotelephone function, is shown disposed in a vehicular arrangement 103. The wireless device 101 conventionally connects to a fixed radio base station environment 105 and a telephone network 107. The telephone network may operate under any of the known standards provided that it offers to the user wireless device the features of call-waiting and caller-ID. Call-waiting is a familiar feature to land line telephone users: a calling party places a call to a called party, but the called party is engaged in a call with a third party. The called party is given the option to suspend the call with the third party and switch to the new calling party call with a momentary activation of the hookswitch, activation of a flash button, or other indication of acceptance. Caller-ID, likewise, is familiar to landline telephone users as a feature that transmits the calling party's telephone number to a called party's telephone device, typically during the ringing signal or during the period of call set up, but before the call is answered. Caller-ID is known in some instances to provide a name or other identification associated with the calling telephone number. The information regarding the caller is made available to the called party's telephone device and is typically displayed on a visual display. Implementation of call-waiting and caller-ID in conventional fashion is likely to distract a vehicle operator when that operator is interrupted with the need to look at a display screen or activate tactile response elements.

Since it is desirable to enable a handsfree operation of the user wireless device 101, a preferred embodiment encompasses the use of headset-type devices 109, over-the-ear devices 111, and mountable box-type devices 113, which may be mounted on the vehicle's visor or other convenient and acoustically-desirable location. Each of these handsfree devices of a preferred embodiment communicate without wires with the user wireless device using a short range electromagnetic transceiver, preferably a transceiver operating under a standard protocol such as the IEEE 802.15 Bluetooth standard, but alternatively under a protocol and electromagnetic transmission medium that offers audio and control functions necessary for handsfree telephony.

Figure 2:
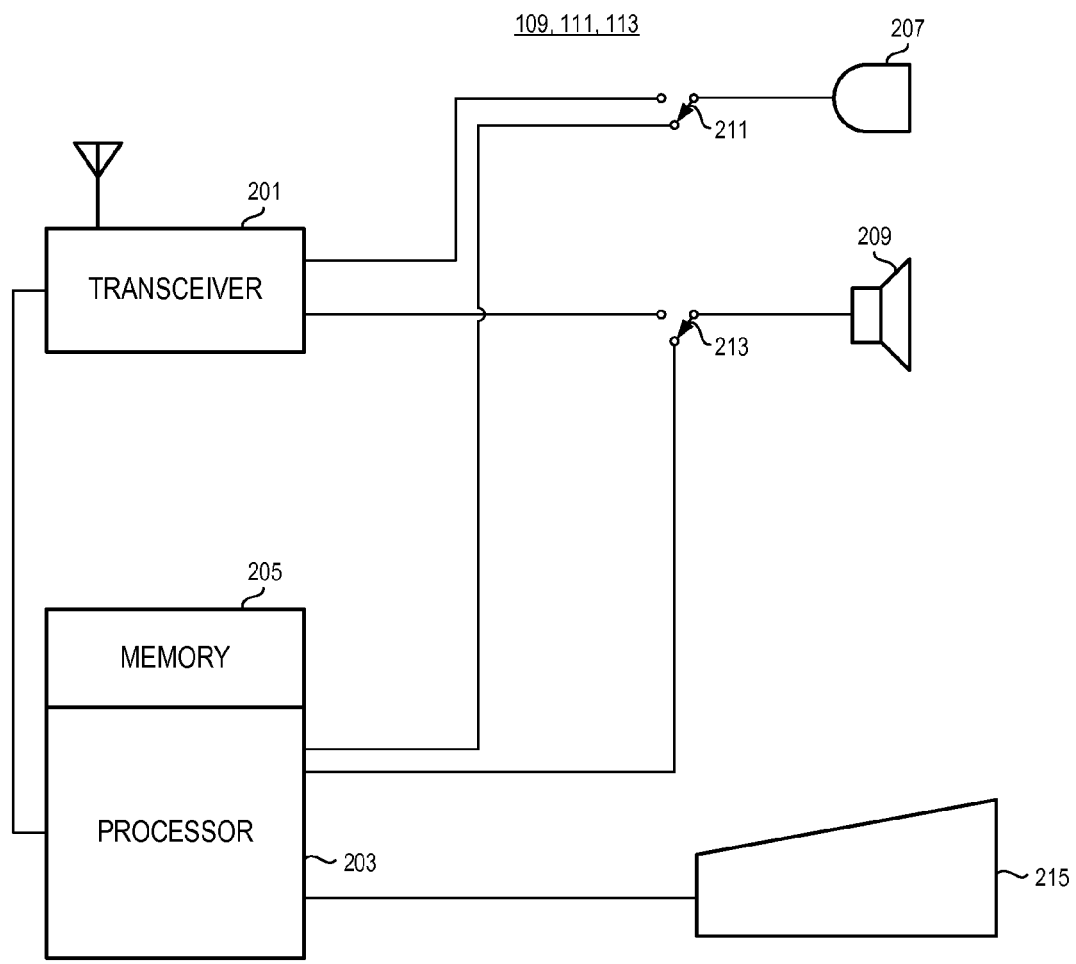
FIG. 2 is a block diagram of a handsfree device which may employ the present disclosure.

Further details regarding the handsfree devices 107, 109, and 113 may be found in the block diagram of FIG. 2. The short range electromagnetic transceiver 201 is controlled by a processor 203 and associated memory 205, which execute a set of instructions that provide call communications and control between the handsfree device and the user wireless device 101. Acoustic transducers, a microphone 207 and a speaker 209, are switchably associated with both the transceiver and the processor via switch functions 211 and 213 controlled by the processor. Moreover, a user interface 215 comprises user input devices that enable the user to interact with the handsfree device, primarily through control functions of the processor.

In one preferred embodiment, user control of the handsfree device is accomplished by a combination of tactile input devices (via interface 115) and spoken word interpretation (via microphone 207). In one embodiment, three buttons (or switches) are provided. One is a dedicated power switch for power on/off control, one is a multifunction button (MFB) for basic call control and activation, and one is a voice command (VC) button for independent voice command and voice recognition features. The MFB, in this embodiment, is sensitive to the duration the button is activated and is able, therefore, to address a plurality of functions. Once the user activates the VC button, the user hears a "say a command" prompt from the speaker 209 and the user can state the feature/function desired, which is transduced by the microphone 207 and supplied to the processor for speech interpretation. For example, the handsfree device includes a user Options Menu that lists device settings that are user changeable by voice command. Entry to the Options Menu is accomplished by the user with an activation of the VC button followed by the command "Options". Once in the Options Menu, the user can say a setting command such as "Caller ID". The handsfree device will inform the user via the speaker 209 of the current setting state (i.e., "on" or "off"), to which the user can then say a new state, or "cancel". After interpreting the speech information and changing the state, the handsfree device confirms the new state.

In a preferred embodiment in which the communication protocol between the handsfree device and the wireless device is the Bluetooth standard, upon a first power-on, or any time the user enters the device pairing mode, a multi-step script is audibly presented to the user via speaker 209, with a pause after each step. The user must say "continue" between each step. If the user does not say "continue" or "cancel" after fifteen seconds, the handsfree device will continue on to the next step. The inquiry (the discovering of Bluetooth enabled devices in the radio vicinity) is performed by the wireless device and not by the handsfree device; the handsfree device scans for the inquiry activity that is carried out by the wireless device.

When an incoming call is received by the user wireless device 101, the user may respond to the handsfree device with the word "Answer" or the word "Ignore"—the handsfree device is automatically listening for this response when an incoming call is received. Alternatively, the user can "tap" the MFB to accept the call, or "double-tap" to reject it. When a second call has been made to the user but the user is engaged in the first call, the network provides call-waiting service. The user wireless device is notified of the second call and caller-ID information, if available from the network, is received by the wireless device. During the notification for this second call, the user is alerted with an acoustic "beep" tone from the speaker 209 to indicate the presence of the waiting second call. At the user's option, the VC button is activated once to deliver the caller-ID details to the speaker 209 for the user to hear. The user may barge in to interrupt the caller-ID detail delivery, or wait until it is complete and say "Answer" or "Ignore" to instigate the appropriate action. Alternatively, the user can tap the MFB button to answer the call, or double tap to ignore. After pressing the VC button, the uplink and downlink audio from the transceiver are decoupled from the microphone 207 and the speaker 209 so that the user may hear and respond to the prompt.

Figure 3:
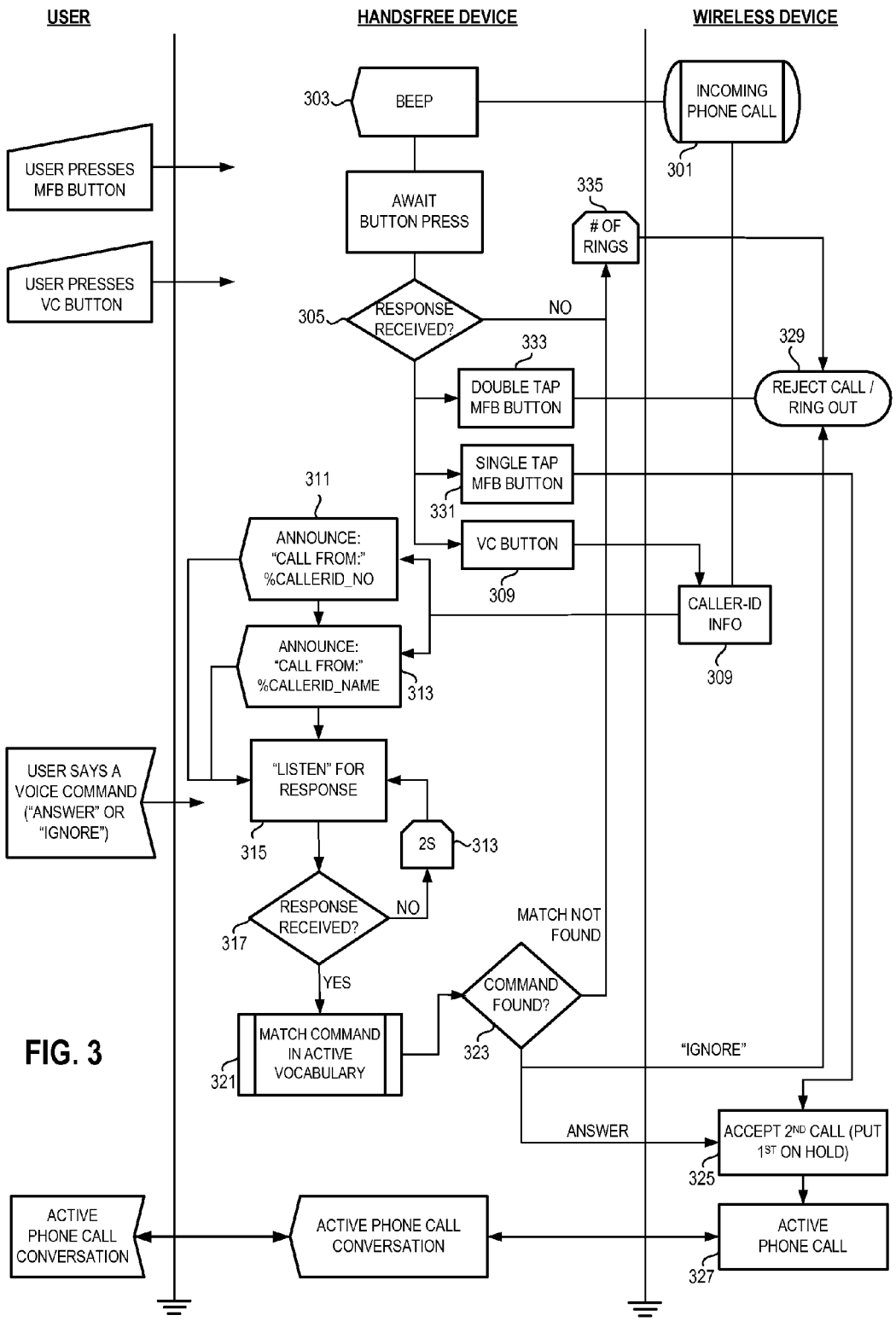
FIG. 3 is a flowchart of a process stored in a memory and executed by a processor to enable the present disclosure.

Referring now to FIG. 3, a flowchart of the process stored in memory 205 and executed by processor 203 to enable the present disclosure is shown. When the wireless device 101 is notified of a second call held in call-waiting, at 301, an instruction is sent to and accepted by the handsfree device, resulting in an acoustic alert, a "beep", generated and delivered to the user via the speaker 209, at 303. Upon the user activating a user interface element, the VC button or the MFB button, the handsfree device determines that a response has been received and accepted from the user, at 305, and proceeds to take action depending upon which button was activated. If the VC button is determined to have been activated, at 307, the wireless device is informed and stored caller-ID information is recalled, at 309, and received by the handsfree device. The caller-ID information, which typically is a telephone number or a caller name, is converted into a speech signal and delivered to the user via speaker 209, as diagrammed at 311/313. The speaker 209 is decoupled from the transceiver 201 during this time and coupled to the processor 203. The handsfree device enters into a two second waiting loop at 315, 317, 319, awaiting a response from the user. If the user does not respond within two seconds, the handsfree device returns to a state of call-waiting alerting. The user may respond to the caller-ID announcement with a voice command of "Answer" or "Ignore", which command is transduced by microphone 207 and coupled to the processor 203. Alternatively, the user may answer or ignore the call-waiting second call with a MFB button single tap or double tap, respectively. The handsfree device listens to the user's response, at 315, and attempts to vocabulary-match in its memory of active vocabulary commands, at 321. If the command cannot be matched, at 323, the handsfree device is returned to a state of call-waiting alerting. If a match to "Answer" is found at 323, the wireless device is notified and the second call is accepted and made an active call while the first call is placed on hold, at 325 and 327. If a match to "Ignore" is found, the wireless device is so notified and the second call is rejected from call-waiting, at 329, and the call-waiting call is directed to a voice mailbox or another disposition depending upon the user's preferred settings.

If the user's response to the call-waiting alert is a single tap of the MFB button, as determined at 331, the wireless device is notified and the second call is accepted and made an active call while the first call is placed on hold, as shown at 325 and 327. If the user's response to the call-waiting alert is a double tap of the MFB button, as determined at 333, the wireless device is notified and the second call is rejected from call-waiting and disposed of according to user preference settings, at 329. If no user response to the call-waiting alert is detected for a set number of call-waiting alerts presented to the user, as determined by the response received, 305, -number of rings, 335, loop, the second call is rejected from call-waiting and disposed of according to user preference settings, at 329. In a preferred embodiment, the number of call-waiting alerts before the waiting call is rejected is set at four.

Thus, as described above, advancements in a handsfree device are disclosed that offer additional wireless telephone services to the user of a wireless device in a minimally distracting manner. A call-waiting notification of a second call is presented acoustically via a handsfree device to the vehicle operator. A responsive action by the user to request caller-ID information yields an audible presentation of caller-ID information related to the second call. The user may elect to answer the second call during or following the presentation of the caller-ID information.

The invention claimed is:

1. A non-transitory computer readable medium having a stored set of instructions that when executed by a processor cause a handsfree device communicating with a wireless device connected to a network providing a call-waiting feature and caller-ID information to:
   receive caller-ID information from the wireless device for a second call while a first call is in progress;
   deliver an alert to a user of the wireless device indicating the second call;
   convert the caller-ID information to a speech signal, in response to a user input via a user interface;
   decouple a speaker and a microphone from a transceiver of the handsfree device; and
   couple the speaker to the processor to deliver the speech signal;
   accept a first activation of a user-activated input prior to the first call;
   convert a predetermined response to a predetermined speech signal for delivery to the speaker in response to the first activation;
   accept the first call; and
   accept a second activation of the user-activated input after the alert wherein
   the speech signal is delivered to the speaker in response to the second activation of the user-activated input, thereby delivering the caller identity signal instead of the predetermined speech signal for the second call.

2. The non-transitory computer readable medium of claim 1 wherein the instructions of the non-transitory computer readable medium are further to:
   couple the microphone to the processor to accept a user spoken response to the speech signal;
   determine a match of the user spoken response to a stored command; and
   inform the wireless device of the match.

3. The non-transitory computer readable medium of claim 1 wherein delivery of the alert to the user further comprises delivery of an acoustic tone via the speaker.

4. The non-transitory computer readable medium of claim 1 wherein the predetermined speech signal is "say a command".

5. A method for providing communications between a handsfree device and a user wireless device engaged in communications with a network providing a call-waiting feature and caller-ID information, comprising:
- presenting acoustically a call-waiting notification of a second call to a user when the wireless device is engaged in a first call;
- receiving a response to the call-waiting notification from the user;
- presenting caller-ID information related to the second call acoustically to the user in response to receiving the call-waiting notification response;
- receiving a first manual input on a first button of the handsfree device prior to engaging in the first call; and
- presenting a predetermined response acoustically to the user in response to the receiving of the first manual input, wherein
- the response to the call-waiting notification is received in response to a second manual input on the first button, and whereby
- the caller-ID information is presented instead of the predetermined response in response to activating the first button, thereby reducing driver distraction when the user of the handsfree device is operating a vehicle.

6. The method of claim 5 further comprising accepting an audible command from the user to answer the second call subsequent to the presentation of caller-ID information.

7. The method of claim 6 wherein accepting an audible command further comprises determining a match of the audible command with a command in a stored vocabulary.

8. The method of claim 6 wherein accepting an audible command answers the second call and places the first call on hold.

9. The method of claim 5 further comprising providing electromagnetic communications complying with a Bluetooth protocol between the handsfree device and the user wireless device.

10. An apparatus for enabling handsfree communications via a wireless device engaged in communication with a network providing a call-waiting feature and caller identity information, comprising:
- a transceiver;
- a user-activated input device that accepts a user command;
- a speaker switchably coupled to the transceiver, that converts signals received by the transceiver into audible signals;
- a microphone, switchably coupled to the transceiver, that converts acoustic signals into electrical signals to be transmitted by the transceiver; and
- a processor and associated memory, configured to:
  - receive caller identity information from the wireless device for a second call while a first call is in progress;
  - deliver an alert to the speaker indicating the second call;
  - convert the caller identity information to a speech signal in response to user input via the user interface;
  - decouple the speaker and the microphone from the transceiver;
  - couple the speaker to the processor to deliver the speech signal;
  - accept a first activation of the user-activated input device prior to the first call;
  - convert a predetermined response to a predetermined speech signal for delivery on the first acoustic transducer in response to the first activation;
  - deliver the alert to the speaker signifying the second call during the first call; and
  - accept a second activation of the user-activated input device after the alert, wherein
  - the speech signal is coupled to the speaker in response to the second activation of the user-activated input, thereby providing the caller identity signal instead of the predetermined response in response to the second call.

11. The apparatus of claim 10 wherein the processor and associated memory is further configured to:
- couple the microphone to the processor to accept a user spoken response to the speech signal;
- determine a match of the user spoken response to a stored command; and
- inform the wireless device of the match.

12. The apparatus of claim 10 wherein the alert is an acoustic tone delivered via the speaker.

13. A method for providing communications between a handsfree device, including a transceiver, a user-activated input device, a speaker and a microphone switchably coupled to the transceiver, and a processor and associated memory, and a wireless device engaged in communications with a network providing a call-waiting feature and caller identity information, said method comprising:
- accepting from the wireless device an indication of a second call made by a caller and directed to the wireless device while the wireless device is engaged in a first call:
- receiving an indication of an identity of the caller from the wireless device;
- delivering an alert to a user of the wireless device signifying the indication of the second call;
- accepting an activation of the user-activated input device by the user;
- converting to a speech signal, in response to the activation of the user-activated input device, the indication of the caller identity;
- decoupling the speaker and the microphone from the transceiver, in response to the activation of the user-activated input device;
- coupling, in response to the activation of the user-activated input device, the speaker to the transceiver to deliver the speech signal;
- accepting a first activation of the user-activated input device prior to the first call;
- converting a predetermined response to a predetermined speech signal for presentation on the speaker in response to the first activation; and
- accepting a second activation of the user-activated input device after the alert, whereby
- the speech signal provides a caller identity signal instead of the predetermined response in response the second call.

14. The method of claim 13 wherein the accepting an activation of the user-activated input device further comprises accepting activation of a switch.

15. The method of claim 14 further comprising:
- switchably coupling the microphone to the processor to accept a user spoken response to the speech signal;
- determining a match of the user spoken response to a stored command; and
- informing the wireless device of the match.

16. The method of claim 13 wherein delivering the alert to the user further comprises delivering an acoustic tone via the speaker.

* * * * *